US008526464B2

(12) United States Patent
McNew et al.

(10) Patent No.: US 8,526,464 B2
(45) Date of Patent: Sep. 3, 2013

(54) ADAPTIVE CONTENTION WINDOW IN DISCONTINUOUS WIRELESS COMMUNICATION CHANNELS

(75) Inventors: Justin Paul McNew, Del Mar, CA (US); John Thomas Moring, Encinitas, CA (US)

(73) Assignee: Kapsch Trafficcom AG, Vienna (AT)

( * ) Notice: Subject to any disclaimer, the term of this patent is extended or adjusted under 35 U.S.C. 154(b) by 436 days.

(21) Appl. No.: 12/694,189

(22) Filed: Jan. 26, 2010

(65) Prior Publication Data
US 2011/0182171 A1 Jul. 28, 2011

(51) Int. Cl.
*H04J 3/16* (2006.01)
(52) U.S. Cl.
USPC ........... 370/465; 370/242; 370/464; 370/447; 370/448; 370/498
(58) Field of Classification Search
USPC .................................. 370/242, 464–465, 498
See application file for complete search history.

(56) References Cited

U.S. PATENT DOCUMENTS

| 7,127,519 B2 | 10/2006 | Li |
| 7,245,604 B2 | 7/2007 | Benveniste |
| 2002/0154653 A1* | 10/2002 | Benveniste ............... 370/447 |
| 2002/0188750 A1* | 12/2002 | Li ........................... 709/235 |
| 2004/0114560 A1* | 6/2004 | Jacobsen .................. 370/338 |
| 2004/0170150 A1* | 9/2004 | Guo et al. ................ 370/338 |
| 2009/0196306 A1 | 8/2009 | King et al. |

OTHER PUBLICATIONS

International Search Report and Written Opinion for corresponding PCT Application No. PCT/US2010/023745; 8 pp.

* cited by examiner

*Primary Examiner* — Hassan Kizou
*Assistant Examiner* — Ashil Farahmand
(74) *Attorney, Agent, or Firm* — Christie, Parker & Hale, LLP

(57) ABSTRACT

A system and method for discontinuous wireless communication. The system and method include estimating a first likelihood of channel collisions at start of a discontinuous channel interval, wherein the estimated likelihood of collision is increased when a transmission failure is detected during a portion of one or more previous channel intervals; setting a size of a contention transmission window at start of a current channel interval, according to the first estimated likelihood of channel collisions; estimating a second likelihood of channel collisions for a next channel interval; and dynamically changing the size of the contention transmission window for the next channel interval, according to the second estimated likelihood of channel collisions.

18 Claims, 10 Drawing Sheets

ADAPTIVE CONTENTION WINDOW IN DISCONTINUOUS WIRELESS COMMUNICATION CHANNELS

FIELD OF THE INVENTION

The present invention relates generally to wireless communication systems, and specifically to those where access to the communication channel is limited to periodic intervals. Additionally, the invention pertains to systems where access to the communication channel is based on a contention algorithm. One such architecture is found is the system variously known as Wireless Access in a Vehicular Environment (WAVE) or Dedicated Short Range Communications (DSRC).

BACKGROUND

Access to a wireless communications channel may be via controlled or contention access. In a controlled access system, such as in a cellular or WiMAX (IEEE 802.16) system, devices are generally allocated transmit opportunities that do not conflict with transmissions from other devices. (Some exceptions may exist, as when a device initially enters the network.). In a contention access system, devices transmit at locally determined times, and the possibility of collisions and data loss exits. Examples of such systems are Ethernet (IEEE 802.3) and Wi-Fi (IEEE 802.11).

Collisions are detrimental to the operation of the network, as they result in increased data latency and decreased system throughput (due to retransmissions) and potential data loss. Collisions are difficult to avoid in contention access-based communication systems. Existing communication protocols, such as those named above, attempt to avoid collisions. Devices operating in such systems attempt to receive from the medium before transmitting, and only proceed with transmission if the channel is found to be idle. However, this technique is not error-proof. For example, when a device A is transmitting on the medium, if a device B decides to transmit at the same instant as device A, the two transmissions will collide, typically preventing other receivers from correctly interpreting either transmission. Even if device B's transmission does not occur at the exact instant as device A's, delays in the system (e.g., propagation, processing, and/or receive/transmit switching delays) will prevent the second device from detecting a transmission that begins shortly before its own, again resulting in a collision.

Contention access systems may attempt to recover from data lost through collisions. In this case, when a collision is detected, the transmitting device waits for some time (the "backoff time") and retransmits the data. To guard against a repeating series of collisions, the backoff time may be randomized over a time span called the "contention window."

The above recovery mechanism is problematic when multicast or broadcast transmissions are used. Unlike unicast transmissions, which can benefit from acknowledgements or similar feedback mechanisms, multicast transmissions typically have no feedback from the receiver to the transmitter. Thus the transmitter may have no way to recognize the occurrence of a collision.

The optimal contention window size depends on the number of devices attempting to transmit on the channel. If there are few devices, a short contention window (CW) allows all devices to transmit with small chance of collisions. If more devices are attempting to transmit, the optimal contention window size is longer, to spread transmissions over a longer time and thus reduce the probability of collisions. This is illustrated in FIG. 1, where channel throughput/efficiency curves for three different contention window sizes are shown. The small CW performs best at light channel loading, and the large CW performs best at high channel load. At the lowest ends of the curves, where CW is larger than optimal, there is poor throughput performance because the channel is idle during much of the contention window. At the highest ends of the curves, where CW is smaller than optimal, channel performance is poor because the higher number of transmission attempts in the contention window results additional collisions.

Existing algorithms attempt to optimize performance by dynamically adjusting the CW size. For example, IEEE 802.11 uses an exponential backoff. The CW starts at a small value, CWmin. As long as transmissions are successful (as determined for example, be the receipt of an acknowledgement), CW remains at the CWmin value. However, upon a transmission failure, CW is doubled in size. Another failure will cause another doubling, until a predefined maximum value, CWmax, is reached. This increases CW size under the assumption that collisions result from the presence of a larger network load, and that the system will perform more efficiently with the larger CW, as described above. Any successful transmission (including a multicast transmission, with or without a collision) causes CW to revert to the small CWmin value.

Additional refinements may exist in traditional contention schemes. For example, transmissions of varying priority levels may be assigned different contention window sizes to provide the higher priority traffic with a higher likelihood of transmission.

When traditional contention access techniques are applied to a discontinuous channel, performance degradation in the form of increased collisions may result. A discontinuous channel is one where access is limited to periodic or semi-periodic intervals. For example, in a WAVE system, control and safety information is exchanged on a control or control/safety information (CSI) channel during a "CSI channel interval" which occurs for example 50 ms out of every 100 ms. During the other 50 ms, the "service channel interval," devices may tune to other radio channels for other types of communications exchanges, and no control information is exchanged. Any control information arriving for transmission during the service channel interval must be queued for transmission during the next CSI channel interval. Likewise, service traffic arriving during the CSI channel interval must be queued until the next service channel interval. Since there is a higher than average probability that multiple devices have queued traffic for transmission at the beginning of the channel interval, traditional contention techniques result in poorer system performance when operating over discontinuous channels, since the CW size must adapt over time to the increased channel load found at the start of the channel interval. Therefore, there is a need for a more effective wireless communication channel, in which the contention windows can dynamically be changed at the start of a discontinuous channel interval based on predicted channel behavior.

SUMMARY

The present invention performs substantially better by choosing a more suitable CW size (CWinit) to use at the start of the channel interval and changing the size of CWinit dynamically according to predicted channel conditions. The present invention introduces a contention access technique for improving communications network performance over discontinuous channels via manipulation of the contention window. The contention window may be reset to a larger size at the start of each channel access interval to spread transmissions out in time during heavy loading, thus reducing the probability of collisions. The size of the contention window can then be dynamically adjusted during the course of the channel interval via means known in the prior art.

In some embodiments, the present invention is a method for discontinuous wireless communication. The method includes estimating a first likelihood of channel collisions at start of a discontinuous channel interval, wherein the estimated likelihood of collision is increased when a transmission failure is detected during a portion of one or more previous channel intervals; setting a size of a contention transmission window at start of a current channel interval, according to the first estimated likelihood of channel collisions; estimating a second likelihood of channel collisions for a next channel interval; and dynamically changing the size of the contention transmission window for the next channel interval, according to the second estimated likelihood of channel collisions.

The first (and/or second) estimated likelihood of channel collision is decreased when a transmission success is detected during a portion of one or more previous channel intervals, and the first (and/or second) estimated likelihood of channel collision is increased when a transmission failure is detected during a portion of one or more previous channel intervals.

Furthermore, the size of the contention transmission window may be increased when the first or second estimated likelihood of channel collision is higher than a predetermined value, and the size of the contention transmission window may be decreased when the first or second estimated likelihood of channel collision is lower than the predetermined value.

In some embodiments, the present invention is a device for discontinuous wireless communication. The device includes a memory for storing data for a transmission queue; a transceiver for transmitting and receiving signals; and a processor configured to detect a transmission failure during a portion of one or more previous channel intervals and estimate a first likelihood of channel collisions at start of a discontinuous channel interval, wherein the estimated likelihood of collision is increased when a transmission failure is detected by the transceiver during said portion of one or more previous channel intervals, to set a size of a contention transmission window at start of a current channel interval according to the first estimated likelihood of channel collisions, and to estimate a second likelihood of channel collisions for a next channel interval, wherein the transceiver transmits the stored data for the transmission queue according to the set size of the contention transmission window.

DETAILED DESCRIPTION

Figure 1:
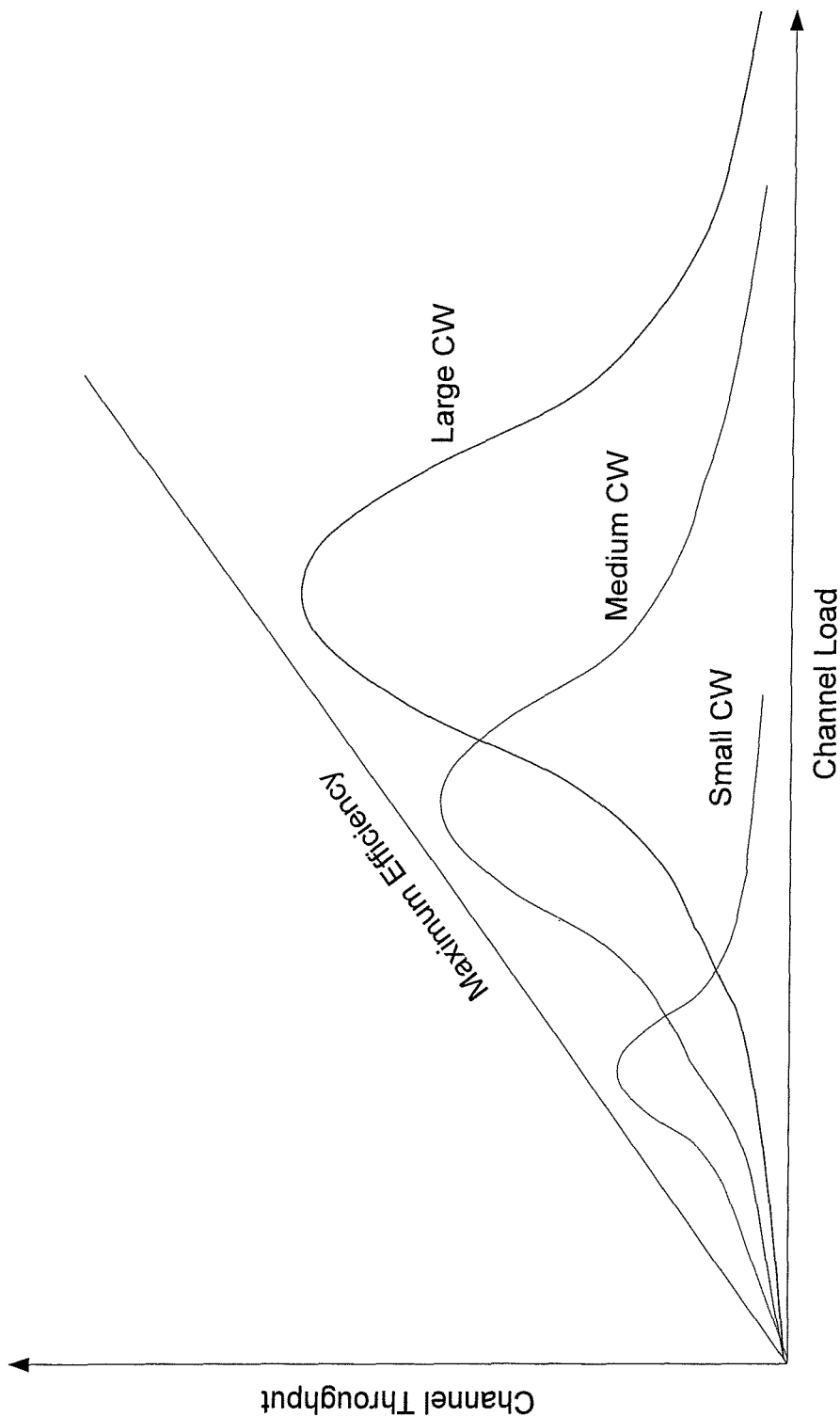
FIG. 1 shows the performance of an exemplary contention communications channel under varying traffic load and with different contention window sizes.
Figure 2:
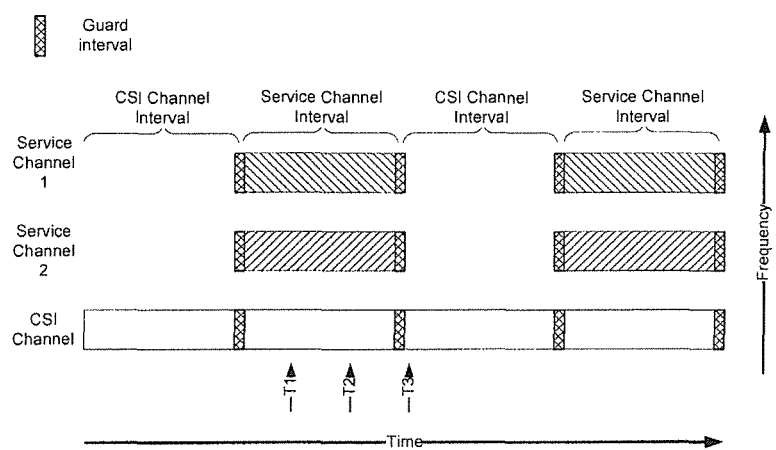
FIG. 2 shows channel intervals aligned in time and frequency.

FIG. 2 shows a representative timing of a typical DSRC/WAVE system. During the CSI channel interval, devices operate on the CSI channel. During the service channel interval devices may operate on one of several service channels. Therefore, operation on either a service channel or the CSI channel is discontinuous. For example, consider control-type transmission units arriving at a device at times T1 and T2, while the device is operating on service channel 1. These transmission units are queued for transmission until the start of the next CSI channel interval, at time T3. Control-type transmission units arriving at other devices during the service channel interval are also queued for transmission on the CSI channel at T3, increasing the likelihood of collision.

Figure 3:
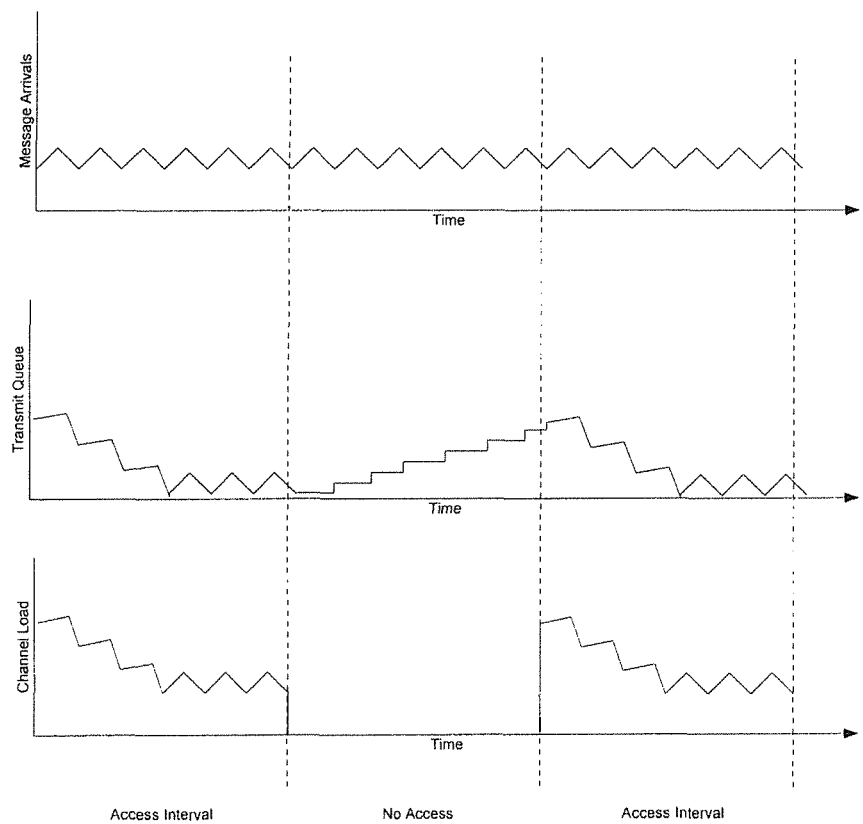
FIG. 3 shows message arrivals and channel loading.

FIG. 3 illustrates an exemplary behavior of packet traffic in a discontinuous communications environment depicting message arrivals and channel loading. Packet arrivals to the system occur at a nominal average rate over time, both during and between access intervals. During the no access time, packets are queued, so the transmit queue at a given device grows. At the beginning of the access interval, device queues are loaded, so the channel loading is high. During this time, the higher traffic load increases the potential for collisions. As packets are transmitted during the access interval, queue sizes and channel loading decrease until nominal levels are reached (here shown about halfway through the access interval). At this point an equilibrium state is reached which continues to the end of the access interval, at which time the cycle repeats.

Figure 4:
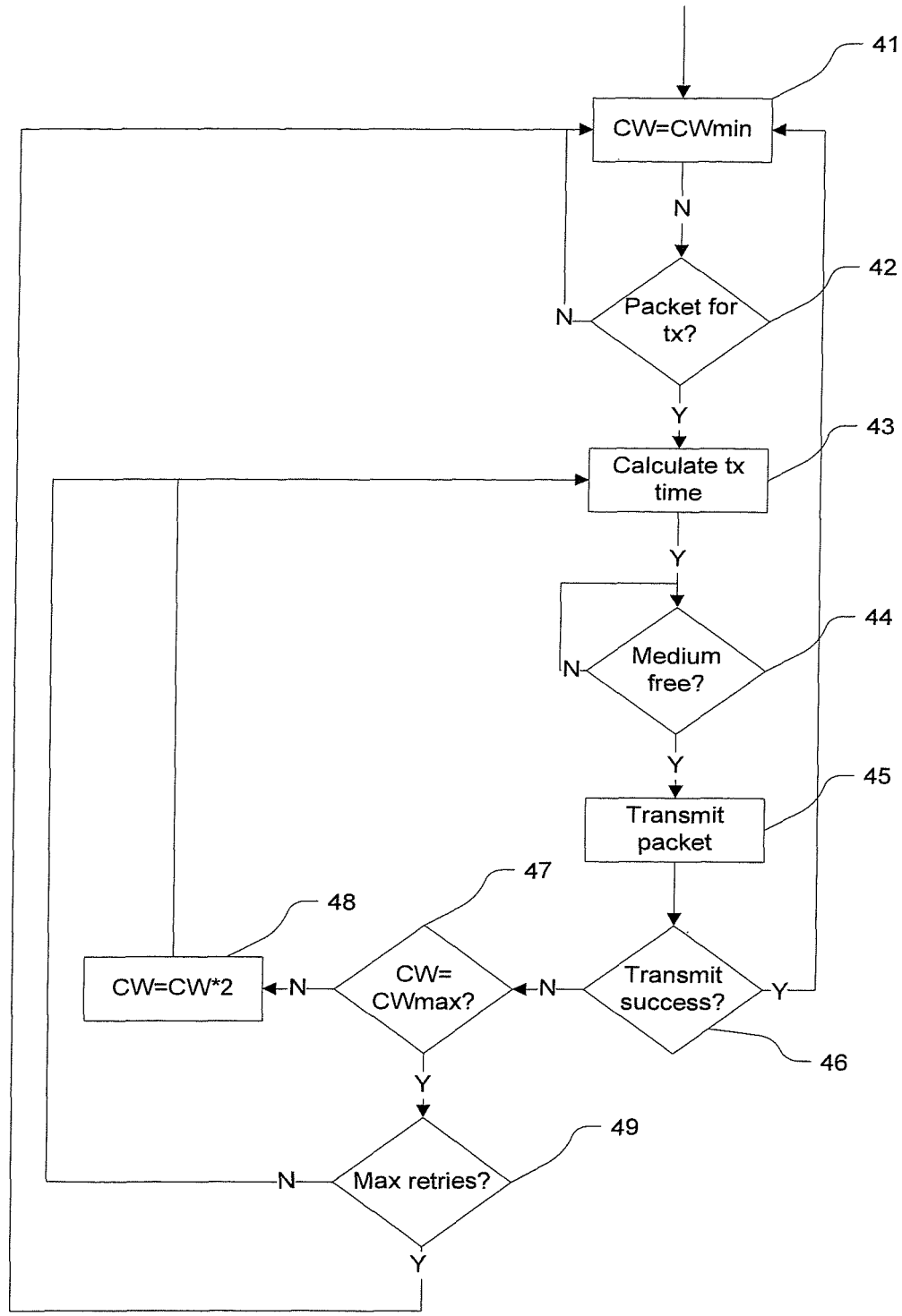
FIG. 4 shows an example of a contention backoff algorithm per the prior art.

FIG. 4 illustrates a typical contention backoff process according to the prior art, such as those implemented in a device based the IEEE 802.11 standard. Initially, the contention window CW is set to a predefined minimum value CWmin (41). The device determines if a packet is queued for transmission (42), and if not, it waits. When a packet is ready for transmission, it calculates the transmission time (43), which consists of a random backoff within the contention window. At the transmission time, the device ensures that the medium is not in use (44), and transmits the packet accordingly (45). If the packet is successfully transmitted (e.g., an acknowledgement is received showing no collision), then the device goes to its initial state. If the packet is not successfully transmitted (46), the device checks whether CW is at its maximum value (47). (With no feedback concerning its reception, the transmission of a broadcast packet is considered a success, in which case the process restarts.). If not, the CW size is increased (48) and an attempt is made to retransmit the packet at a later time.

If CW has reached its maximum size, the device checks whether the packet has already been retransmitted the maximum allowed times (49). If not, another attempt is made to retransmit the packet. If the maximum transmit attempts have been reached, the packet is dropped, and the algorithm resumes from the beginning. (Under some conditions, for example, if the maximum retry count is low, it is possible that the maximum transmit attempts could be reached before the contention window reaches its maximum size. For simplicity, this case is not illustrated.).

Figure 5:
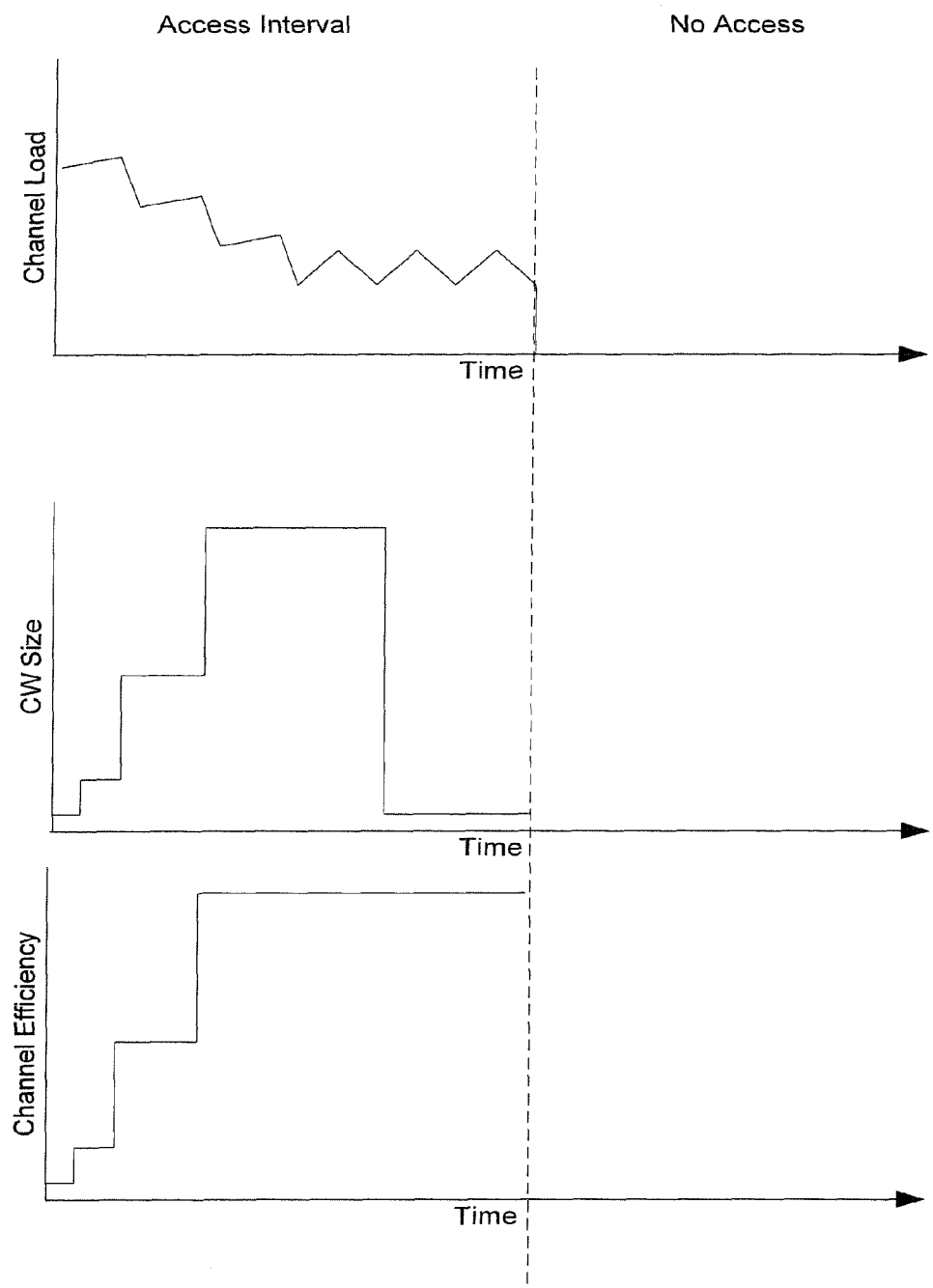
FIG. 5 shows representative performance of a traditional communication system with adaptive contention window.

FIG. 5 shows how the above process performs in a discontinuous communications system. As illustrated, at the start of the channel access interval, the CW is small, but the channel load is large, resulting in poor performance due to excessive collisions. It takes some time for the CW value to adapt to the high load at the start of the channel interval. The present invention improves this performance by adjusting CW to a value appropriate to the current channel conditions.

Figure 6:
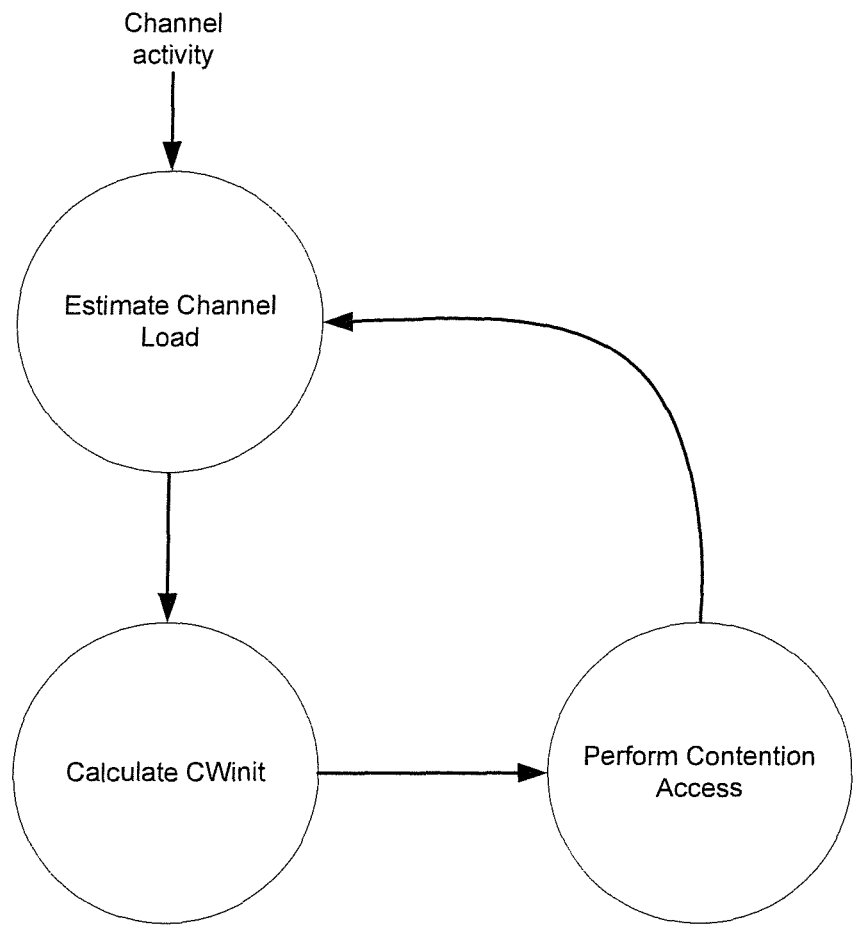
FIG. 6 depicts an exemplary flow chart, according to some embodiments of the invention.

FIG. 6 depicts an exemplary state diagram, according to some embodiments of the invention. There are three states as indicated in FIG. 6. Each state is described in detail in the following paragraphs.

A. Predict (estimate) channel behavior (load). This state involves predicting the likelihood of multiple transmissions contending for channel access at the start of a channel access period, based on recent channel activity, historical activity, and/or other relevant information. For example, multiple transmissions contending for channel access at the start of a channel access period constitute a greater chance of collision.

B. Calculate the initial Contention Window size (CWinit). Based on the estimated (predicted) channel behavior (load), a preferred CWinit is calculated, to optimize system performance under the estimated (predicted) channel conditions. For example, a larger CWinit reduces the likelihood of collision.

C. Perform contention access. In this state, the calculated CWinit is used in the contention access process, starting in the next channel interval. Using the selected CWinit value, improved channel performance is achieved.

Figure 10:
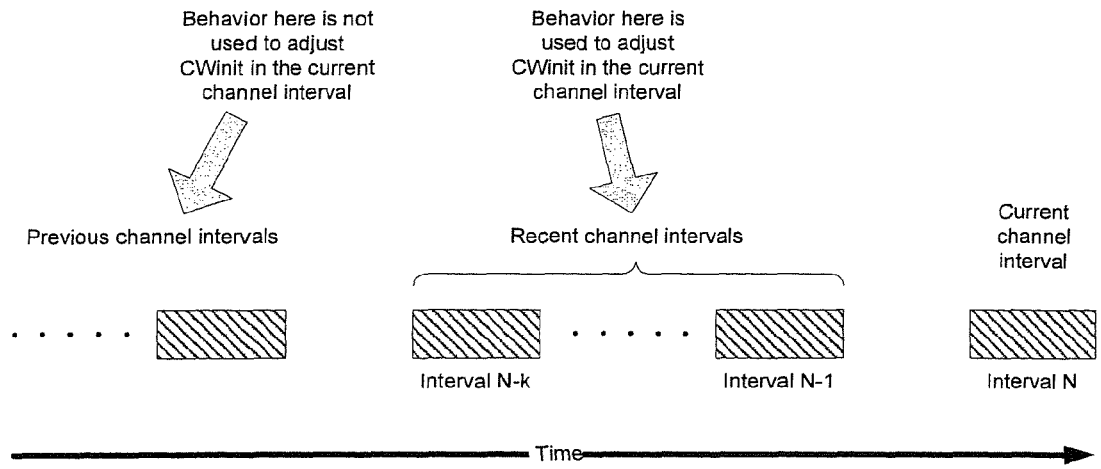
FIG. 10 is an exemplary diagram illustrating how conditions observed in previous M channel intervals may be used in calculating the initial contention window size for a current channel interval, according to some embodiments of the invention.

Predict (estimate) channel behavior (load) involves predicting the likelihood of multiple transmissions contending for channel access at the start of a channel access period, based on recent channel activities, historical activities, and/or other information. For example, there are several observable events that can be used to predict channel behavior in regards to the transmissions attempted at the beginning of a channel interval. Transmission behavior in the previous channel interval N−1 is typically a good predictor of behavior in the upcoming interval N. This is because traffic load changes slowly relative to channel intervals. Transmission behaviors in the previous channel intervals N−2 . . . N−k may also be good predictors of behavior in the upcoming interval N, as illustrated in FIG. 10.

As described earlier, transmission queues collect packets for transmission leading up to the start of the channel interval, resulting in a bottleneck and higher probability of collisions at the beginning of the channel interval. Over the course of the channel interval, packets are successfully delivered, easing the congestion and resulting in relatively fewer collisions. For this reason, the channel behavior in the early periods near the beginning of the channel interval, before the queues reach steady state (at about 50% of the channel interval illustrated in FIG. 3) is used to estimate the channel loading for the purpose of contention window calculation. The time when the queues are backlogged, before they reach steady state, is the time that the CW is approaching its optimal size for the current conditions. The longer it takes to achieve steady state, the more a higher value of CWinit is indicated.

Events in the early period of interval N−1 that may be used to estimate channel load and are strong predictors of the likelihood of collisions in the early period of interval N may include the following.

The communicating device having had an unsuccessful or deferred transmission attempt in the early period of interval N−1 (and intervals N−2 . . . N−k) implies a higher likelihood of collision in interval N. In contrast, the communicating device having had a successful transmission attempt in the early period of interval N−1 (and intervals N−2 . . . N−k) implies a lower likelihood of collision in interval N.

Detecting collisions by the communicating device among other devices in the early period of interval N−1 (and intervals N−2 . . . N−k) implies a higher likelihood of collision in interval N. The fewer the detected collisions, the less likely collisions in interval N.

Detecting channel busy by the communicating device during a large fraction of the early period of interval N−1 (and intervals N−2 . . . N−k) implies a higher likelihood of collision in interval N. The lower the channel busy fraction, the less likely collisions in interval N.

Figure 7:
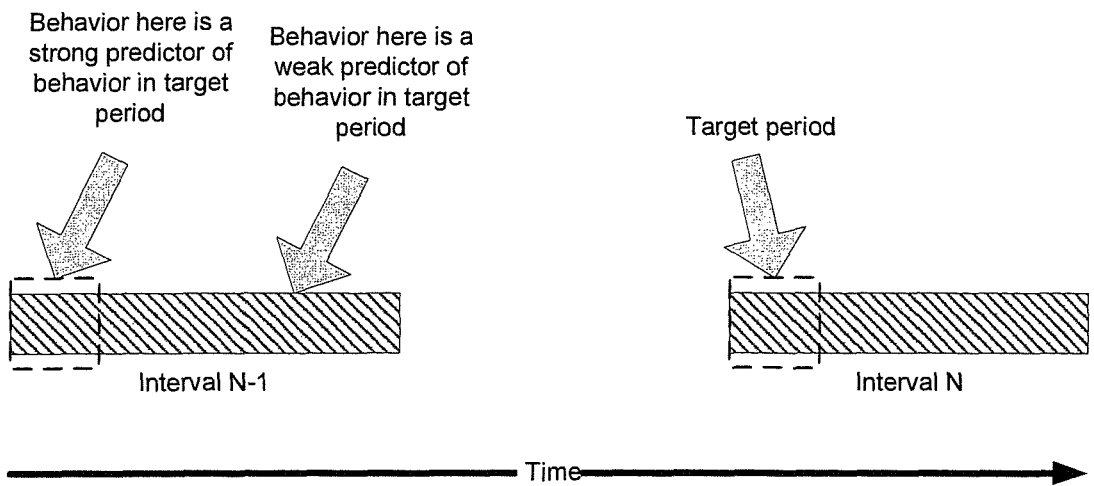
FIG. 7 illustrates the relationship between channel behaviors in one channel interval and the next channel interval, according to some embodiments of the invention.

The same predictors described above, considered across the latter portions of interval N−1, rather than just the early period, can be considered weak predictors of the likelihood of collision in interval N as shown in FIG. 7.

There may be other predictors available in a specific system. The above predictors (factors) can be weighted differently when used in predicting the channel behavior. For example, collisions and/or being busy in interval N−1 may be given a higher weight than collisions and/or being busy in interval N−2, etc. Similarly, collisions in interval N−1 may be given a higher weight than being busy in interval N−1, etc. In other words, the present invention allows a higher weight factor for a transmission failure detected during an immediate previous channel interval and factors increasingly lower weight factors to a transmission failure detected during older previous channel intervals.

An exemplary formula for calculating the initial contention window size is described below.

$$CWinit_N = CW_0 + s \sum_{n=1}^{k} (L_n * w(n))$$

a) where:
b) $CWinit_N$ is the initial contention window size for the current channel interval N
c) $CW_0$ is a base, or minimum allowed contention window size, used for example when there is no channel loading
d) s is a scaling factor to keep the range of contention window sizes within a predefined bound. (For example, the contention window size must not exceed the channel interval duration.)
e) k is the number of recent channel intervals that are considered in the calculation. In a simple case, k=1 and only the most recent channel interval is considered.
f) n is the count of the recent channel intervals. For example, n=1 indicates the immediately previous channel interval (N−1); n=k indicates the oldest channel interval that is considered in the calculation.

g) $L_n$ is the loading factor (predictor of collisions) calculated for channel interval n. Calculation of the loading factor may consider such factors as collisions or channel busy as described previously. In a simple case, $L_n$ takes only two values, e.g., 0 for light loading, 1 for heavy loading.

h) w(n) is a function of the remoteness in time of the channel interval for which $L_n$ was calculated. w(n) in this example is a positive number and has an inverse relationship to n (w(n) decreases as n increases). Its effect is to weight $L_n$ such that more recent loading factors have a greater impact on the result. In the simplest case, w(n) equals 1.

In some embodiments, a communication device according to the present invention monitors the events listed above, and generates an estimate of whether collisions are likely in interval N. The weight given to each event in the estimation process may be tailored to the specific characteristics of the operational system. Strong predictors are given more weight than weak predictors. Note that events over additional previous channel intervals (N−2, N−3, etc.) may be used to refine the estimate.

Calculating the initial Contention Window size is performed based on the estimated behavior to optimize system performance under the estimated channel conditions.

Figure 11A:
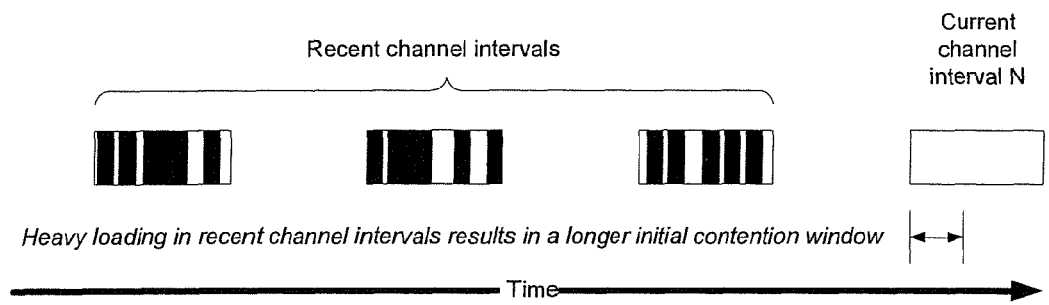
FIG. 11a and FIG. 11b are an exemplary diagrams illustrating how the size of the initial contention window adapts to heavy and light traffic loading in recent channel intervals, according to some embodiments of the invention.
Figure 11B:
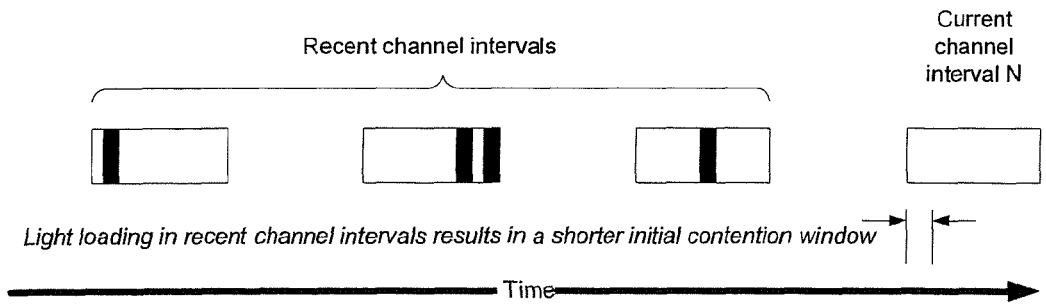

More specifically, if a high likelihood of collisions in interval N is determined, the initial contention window size (CWinit) is increased as illustrated in FIG. 11a. If there is a low likelihood of collisions in interval N, then CWinit is decreased as illustrated in FIG. 11b.

In the Perform contention access state of FIG. 6, the calculated CWinit is used for transmission, starting in the next channel interval N.

Figure 8:
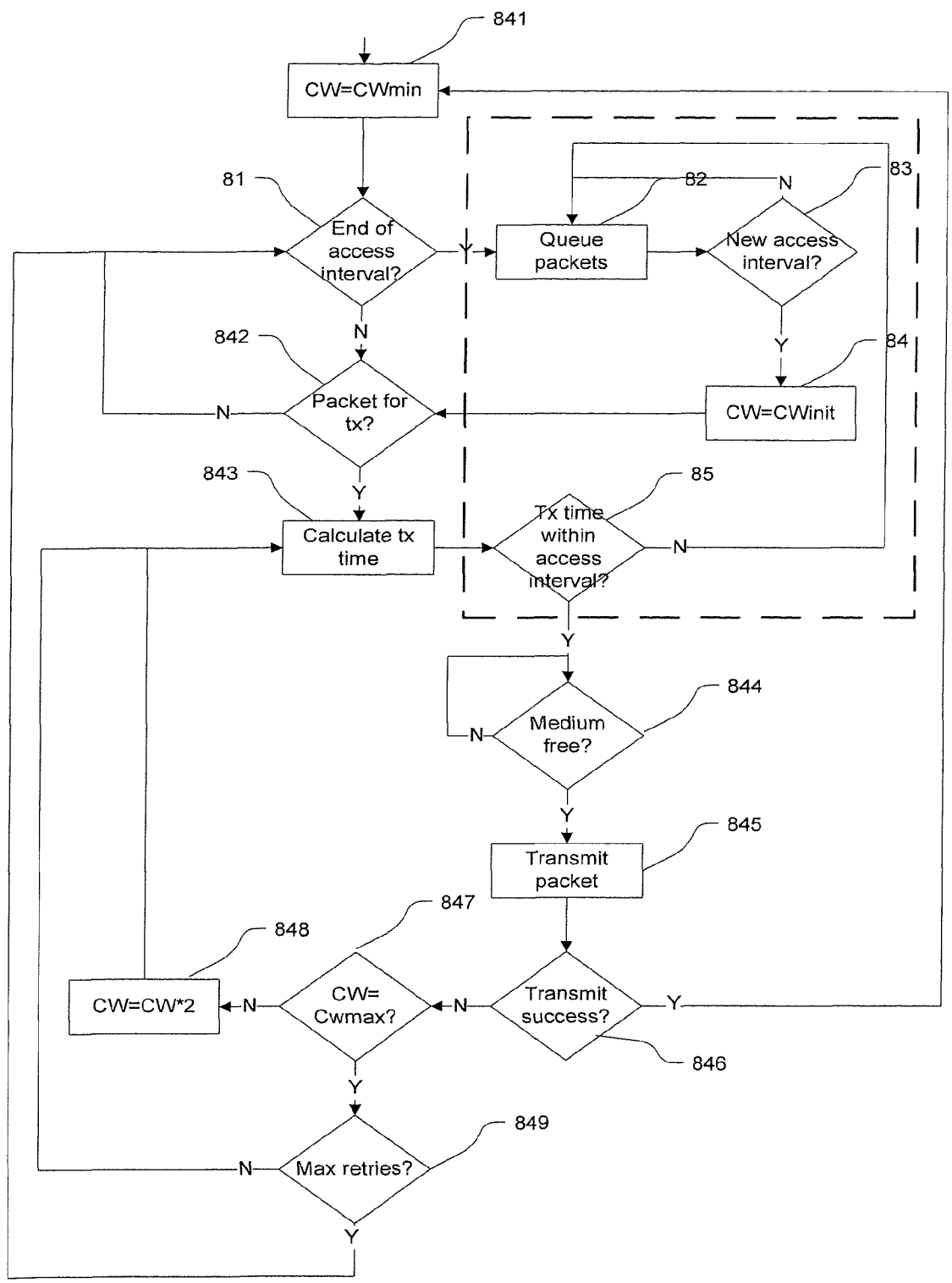
FIG. 8 shows an exemplary process flow performing the transmission of data, according to some embodiments of the invention.

FIG. 8 shows an exemplary process flow performing the transmission of data, according to some embodiments of the invention. At the end of an access interval (81), packets arriving for transmission are queued (82), and none are transmitted. Upon the start of the next access interval (83), CW is set to a new value, CWinit (84), which is used in the calculation of the first packet transmission time (843). Also, when a transmission time is calculated, the device determines whether the calculated time falls within the current access interval (85). If it is the end of access interval, the device is done transmitting in the current access interval, and begins queuing packets (82) and waiting for the next access interval (83). At the start of the next interval, the next transmit time is calculated (843), the normal transmit sequence followed (844-845), and CW is updated (846-849). Note that a broadcast transmission may be considered a success by default in block 846, in which case, CW is reset to CWmin and the process repeats.

Figure 9:
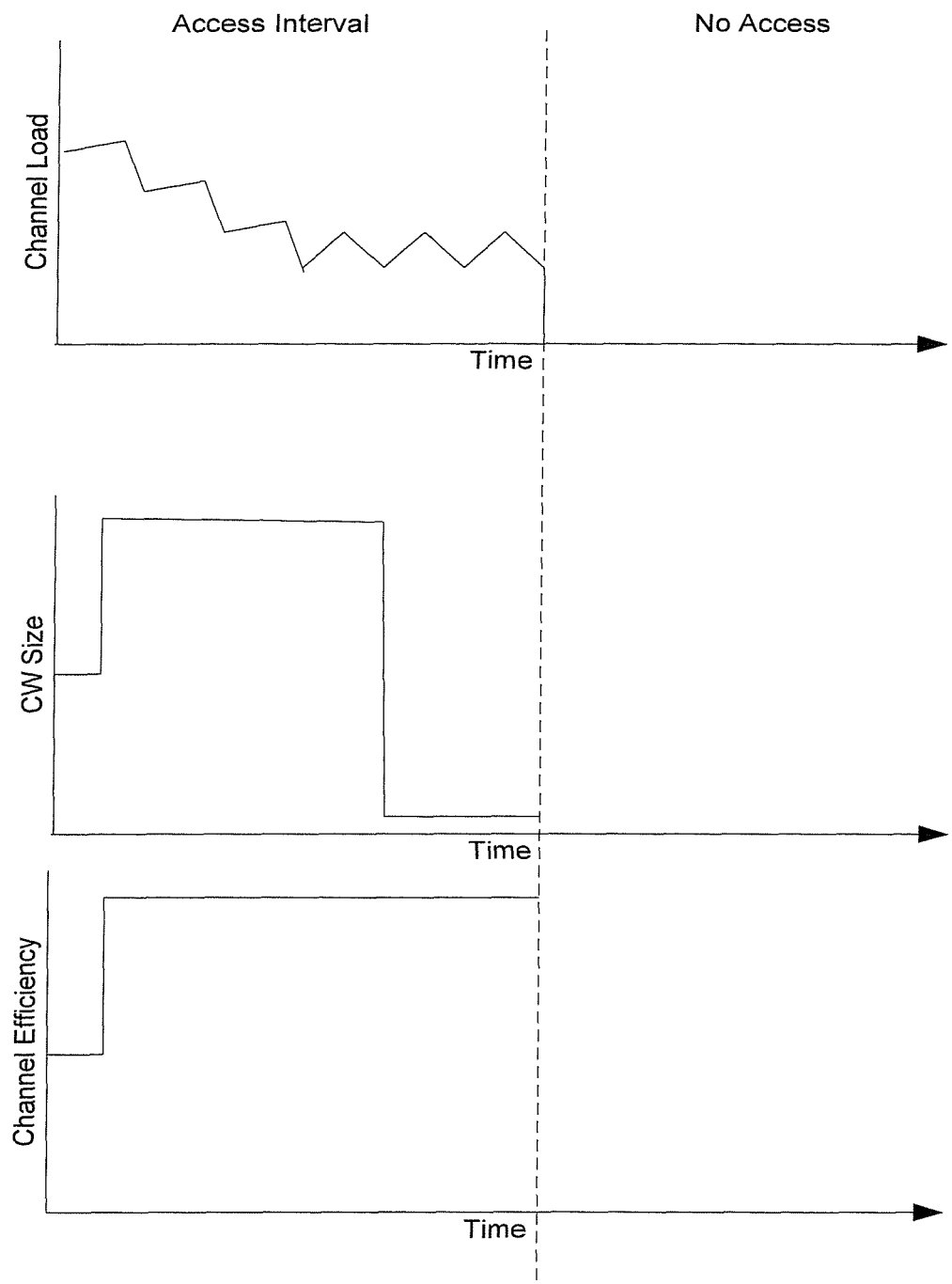
FIG. 9 shows representative performance of a communication system with an adaptive initial contention window at the beginning of a channel interval, improved over the traditional system performance shown in FIG. 5, according to some embodiments of the invention.

FIG. 9 shows how the invention performs in a discontinuous communication system, according to some embodiments of the invention. As shown, at the start of the channel access interval, the CW is better suited for the higher traffic load, resulting in fewer collisions and better efficiency compared to the traditional algorithm illustrated in FIG. 5. CW can more quickly adapt to the optimal value, and the queues reach steady state relatively quickly, resulting in overall improved system throughput and reduced latency.

The above discussion provides a description of a distributed real time embodiment of the invention. Other embodiments include a centralized real time embodiment and an offline embodiment. In these embodiments, channel behavior information is collected (by a central processing unit, or an offline processing unit) which performs the steps of channel load estimation and CWinit calculation. The CWinit value is then distributed (e, g., via a broadcast control message or other configuration mechanism), for use by the communicating devices. In the offline case, the central processor may consider historical behavior information, e.g., accommodating a spike in traffic during morning rush hour.

Figure 12:
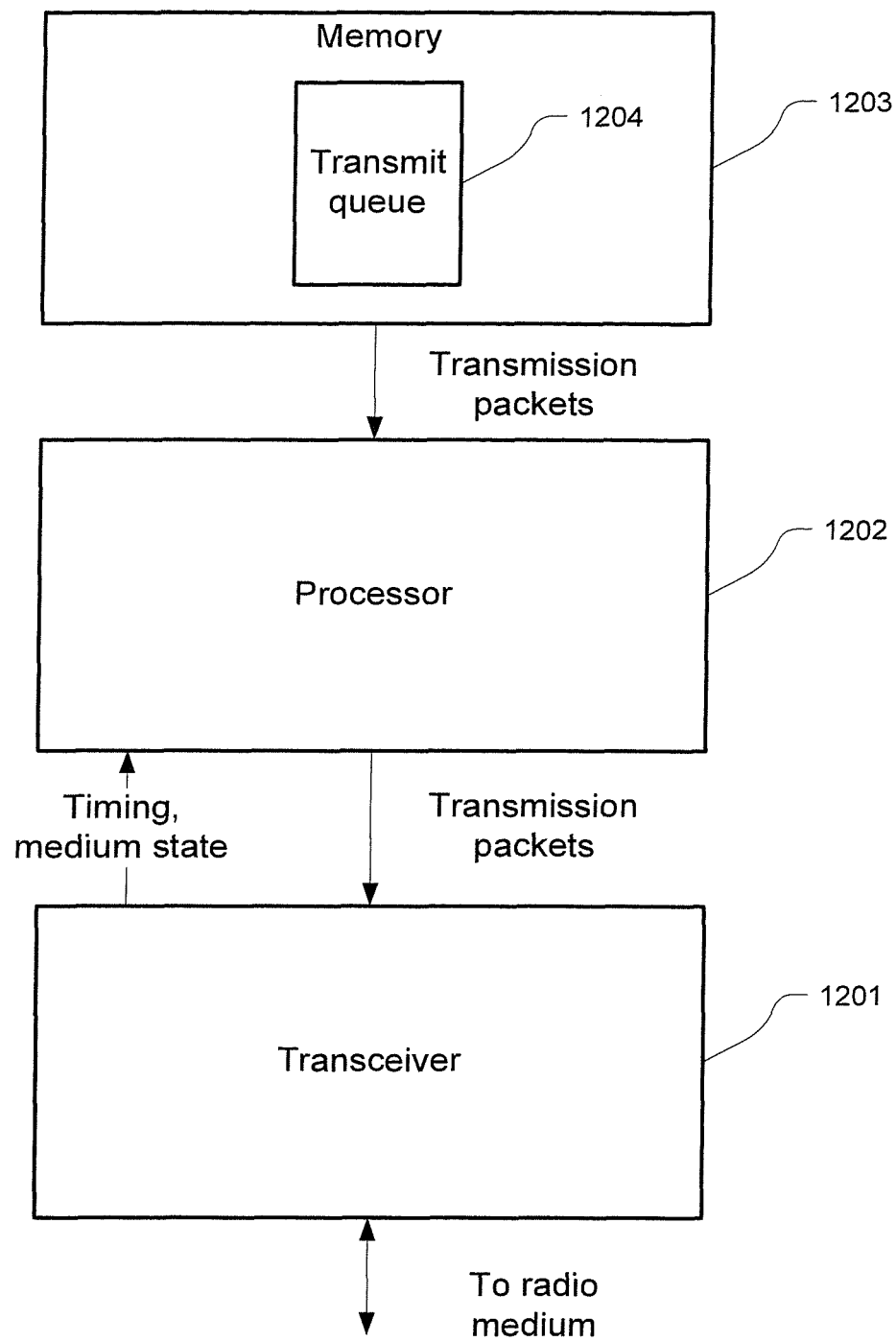
FIG. 12 is an exemplary hardware block diagram of a radio device, according to some embodiments of the invention.

FIG. 12 is an exemplary hardware block diagram of a radio device, according to some embodiments of the invention. The transceiver (1201) includes but not limited to such standard components such as modulator, demodulator, and amplifier. It also may include a channel sensing mechanism (e.g., received power envelope detector) to detect a channel busy state. The modulator function may also include function to detect channel collisions. The transceiver accepts packets for transmission, and delivers information (e.g., busy status) about the medium state to the processor (1202).

The processor may include one or more hardware or software processing elements. Its functions include preparing packets for transmission and implementing the contention access algorithms, including the setting of the contention window size. It considers the medium state as described in this document in deciding when to send packets from transmit queue (1204) residing in the memory (1203), to the transceiver for transmission.

Note that the present invention may be applied to multi-queue (e.g., priority-based) systems as well. In the case of a multi-queue system, a different CWinit value can be used for different transmission priority levels.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for wireless communication between a transmitting device and a receiving device over a discontinuous channel, the method comprising:
    estimating a first likelihood of channel collisions at start of a first discontinuous channel access interval, wherein channel collisions are based on transmission failures of information transmitted by the transmitting device in the discontinuous channel, wherein the estimated likelihood of channel collisions is set to be greater than a likelihood of channel collisions that was set for a previous discontinuous channel access interval, when a transmission failure of the information transmitted by the transmitting device in the discontinuous channel is detected during a portion of one or more previous channel access intervals, and wherein the discontinuous channel includes a no access interval during which the channel is not available for data transmission and an access interval during which the channel is available for data transmission;
    setting a size of a contention transmission window at start of a current discontinuous channel access interval after the first discontinuous channel access interval, according to the first estimated likelihood of channel collisions;
    estimating a second likelihood of channel collisions for a next discontinuous channel access interval after the current discontinuous channel access interval; and dynamically changing the size of the contention transmission window for the next discontinuous channel access interval, according to the second estimated likelihood of channel collisions, where the first or second estimated likelihood of channel collision is increased when a channel busy is detected during a portion of one or more previous channel intervals.

2. The method of claim 1, wherein the first estimated likelihood of channel collision is decreased when a transmission success is detected during a portion of one or more previous channel access intervals.

3. The method of claim 2, wherein the size of the contention transmission window is decreased when the first or second estimated likelihood of channel collision is lower than a predetermined value.

4. The method of claim 1, wherein the second estimated likelihood of channel collision is decreased when a transmission success is detected during a portion of one or more previous channel access intervals.

5. The method of claim 1, wherein the second estimated likelihood of channel collision is increased when a transmission failure is detected by the receiving device during a portion of one or more previous channel access intervals.

6. The method of claim 1, wherein the first or second estimated likelihood of channel collision is adjusted based on detection of channel busy and queue size during a portion of one or more previous channel access intervals.

7. The method of claim 1, wherein the size of the contention transmission window is increased when the first or second estimated likelihood of channel collision is higher than a predetermined value.

8. The method of claim 1, wherein an initial sized contention window is used at the beginning of each channel access interval.

9. The method of claim 1, wherein setting the size of the contention transmission window at start of a current discontinuous channel access interval comprises setting a different size for the contention transmission window for transmission, according, to different priority levels of multiple data queued for transmission.

10. The method of claim 1, wherein said estimating first or second likelihood of channel collisions comprises of predicting likelihood of multiple transmissions contending for channel access, based on recent or historical channel activities, and increasing said first or second estimated likelihood of channel collisions when multiple transmissions are contending for channel access at the start of a channel access period.

11. The method of claim 1, wherein the first or second estimated likelihood of channel collision is increased when a transmission failure by any one of a plurality of communicating devices is detected during a portion of one or more previous channel access intervals.

12. The method of claim 1 further comprising factoring a higher weight factor for a transmission failure detected during an immediate previous channel access interval and factoring increasingly lower weight factors to a transmission failure detected during previous channel access intervals older than the immediate previous channel access interval.

13. The method of claim 1, wherein the portion of one or more previous channel access intervals are the first 50% of channel access intervals of one or more previous channel access intervals.

14. A device for discontinuous wireless communication comprising:
a memory for storing data for a transmission queue;
a transceiver for transmitting and receiving data; and
a processor configured to detect a transmission failure during a portion of one or more previous discontinuous channel access intervals and estimate a first likelihood of channel collisions at start of a first discontinuous channel access interval, wherein channel collisions are based on transmission failures of information transmitted by the device in a discontinuous channel, wherein the estimated likelihood of collision is set to be greater than a likelihood of channel collisions that was set for a previous discontinuous channel access interval, when a transmission failure of the information transmitted by the device in the discontinuous channel is detected during said portion of one or more previous channel access intervals, to set a size of a contention transmission window at start of a current discontinuous channel access interval after the first discontinuous channel access interval according to the first estimated likelihood of channel collisions, and to estimate a second likelihood of channel collisions for a next discontinuous channel access interval after the current discontinuous channel access interval, wherein the transceiver transmits the stored data for the transmission queue according to the set size of the contention transmission window, and wherein the discontinuous channel includes a no access interval during which the channel is not available for data transmission and an access interval during which the channel is available for data transmission, where the first or second estimated likelihood of channel collision is increased when a channel busy is detected during a portion of one or more previous channel intervals.

15. The device of claim 14, wherein the processor is further configured to decrease the first estimated likelihood of channel collision when a transmission success is detected during a portion of one or more previous channel access intervals, and to increase the first estimated likelihood of channel collision when a transmission failure is detected during a portion of one or more previous channel access intervals.

16. The device of claim 14, wherein the processor is further configured to decrease the second estimated likelihood of channel collision when a transmission success is detected during a portion of one or more previous channel access intervals, and to increase the second estimated likelihood of channel collision when a transmission failure is detected during a portion of one or more previous channel access intervals.

17. The device of claim 14, wherein the processor is further configured to increase the size of the contention transmission window when the first or second estimated likelihood of channel collision is higher than a predetermined value, and to decrease the size of the contention transmission window when the first or second estimated likelihood of channel collision is lower than said predetermined value.

18. A system for wireless communication between a transmitting device and a receiving device over a discontinuous communication channel comprising:
means for estimating a first likelihood of channel collisions at start of a first discontinuous channel access interval, wherein channel collisions are based on transmission failures of information transmitted by the transmitting device in the discontinuous channel, wherein the estimated likelihood of channel collisions is set to be greater than a likelihood of channel collisions that was set for a previous discontinuous channel access interval, when a transmission failure of information transmitted by the transmitting device in the discontinuous channel is detected during a portion of one or more previous channel access intervals, and wherein the discontinuous channel includes a no access interval during which the channel is not available for data transmission and an access interval during which the channel is available for data transmission;

means for setting a size of a contention transmission window at start of a current discontinuous channel access interval after the first discontinuous channel access interval, according to the first estimated likelihood of channel collisions;

means for estimating a second likelihood of channel collisions '/' for a next discontinuous channel access interval alter the current discontinuous channel access interval; and means for dynamically changing the size of the contention transmission window for the next discontinuous channel access interval, according to the second estimated likelihood of channel collisions, where the first or second estimated likelihood of channel collision is increased when a channel busy is detected during a portion of one or more previous channel intervals.

\* \* \* \* \*